US009197394B2

(12) United States Patent
Doare et al.

(10) Patent No.: US 9,197,394 B2
(45) Date of Patent: Nov. 24, 2015

(54) CLOCK FOR SERIAL COMMUNICATION DEVICE

(75) Inventors: Olivier Doare, La Salvetat St Gilles (FR); Christophe Landez, Toulouse (FR)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/402,893

(22) PCT Filed: May 29, 2012

(86) PCT No.: PCT/IB2012/001207
§ 371 (c)(1),
(2), (4) Date: Nov. 21, 2014

(87) PCT Pub. No.: WO2013/179077
PCT Pub. Date: Dec. 5, 2013

(65) Prior Publication Data
US 2015/0163046 A1    Jun. 11, 2015

(51) Int. Cl.
*H04L 7/04* (2006.01)
*H04L 7/00* (2006.01)
*G06F 13/42* (2006.01)

(52) U.S. Cl.
CPC .......... *H04L 7/0008* (2013.01); *G06F 13/4291* (2013.01); *H04L 7/04* (2013.01)

(58) Field of Classification Search
CPC ... H04L 7/0337; H04L 7/0025; H04L 7/0008; H04L 7/04
See application file for complete search history.

(56) References Cited

U.S. PATENT DOCUMENTS

| 6,182,175 | B1 | 1/2001 | Nihouran | |
|---|---|---|---|---|
| 6,763,413 | B2 | 7/2004 | Oh | |
| 6,772,251 | B1 | 8/2004 | Hastings et al. | |
| 6,931,027 | B1* | 8/2005 | Vogel et al. | 370/477 |
| 6,993,108 | B1* | 1/2006 | Chi et al. | 375/376 |
| 2003/0112906 | A1* | 6/2003 | Pigott et al. | 375/354 |
| 2007/0115743 | A1 | 5/2007 | Sartori et al. | |
| 2010/0166173 | A1* | 7/2010 | Yang et al. | 379/402 |
| 2010/0272162 | A1* | 10/2010 | Simeon et al. | 375/220 |

OTHER PUBLICATIONS

International Search Report and Written Opinion correlating to PCT/IB2012/001207 dated Feb. 20, 2013.
Motorola: "SPI Block Guide V03.06", Motorola, Inc., 2001, Document No. S12SPIV3/D, Original Release Date: Jan. 21, 2000, Revised: Feb. 4, 2003, pp. 1-38.

* cited by examiner

*Primary Examiner* — Kenneth Lam

(57) ABSTRACT

Versatility and flexibility of integrated circuits can be accomplished by remote control via a serial interface, such as SPI. Read/write accesses to the SPI slave node can be achieved according to SPI protocol by the master node. Additionally, a state machine associated to the slave node SPI needs a local clock to exercise the control of the analog functions following a write access. The serial protocol defines a serial data word transfer to comprise a number of reserved clock cycles that are not assigned for communicating a data bit value of the data word. The slave device comprises a clock unit coupled to the serial clock line for providing a derived clock based on reserved clock cycles. The derived clock is used internally in the slave device to perform internal synchronous operations.

20 Claims, 3 Drawing Sheets

US 9,197,394 B2

CLOCK FOR SERIAL COMMUNICATION DEVICE

FIELD OF THE INVENTION

This invention relates to electronic devices, such as master and slave devices, coupled via a serial interface, and a method of communicating. More specifically, the invention is in the field of clock generation for such devices.

BACKGROUND OF THE INVENTION

Document [1] "Motorola Document Number S12SPIV3/ D—SPI Block Guide V03.06—Original Release Date: 21 Jan. 2000—Revised: 4 Feb. 2003" describes a serial communication system and protocol called Serial Parallel Interface (SPI). SPI allows a duplex, synchronous, serial communication between a master serial device (master control unit MCU) and peripheral electronic device, usually called slave device. The slave device has a serial interface unit for communicating with the master device according to the serial protocol via a serial data line and a serial clock line. SPI defines the serial clock line (SCLK), whereas the serial data line may have various functions (MOSI Master Output, Slave Input; MISO Master Input, Slave Output; MOMI Master Output, Master Input; SISO Slave Input, Slave Output).

The serial protocol defines a clock cycle comprising a clock pulse on the serial clock line and a serial data bit value on the serial data line to be communicated synchronously to said clock pulse, and a serial data word transfer comprising a predetermined number of clock cycles for communicating a data word having data bit values.

Both the master device and the slave device have to perform logical operations to function as required. For such operations a clock is required. The operations in the slave device may interact with the operations of the serial interface unit, and therefore must be controlled to be in line with the clock pulses on the serial clock line. While the slave device requires a clock to perform the logical operations, it is relatively complex to provide such a clock to robustly perform such operations.

SUMMARY OF THE INVENTION

The present invention provides an electronic device, and a master device, comprising a serial interface unit as described in the accompanying claims. The present invention further provides method of communicating between a slave device and a master device as described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
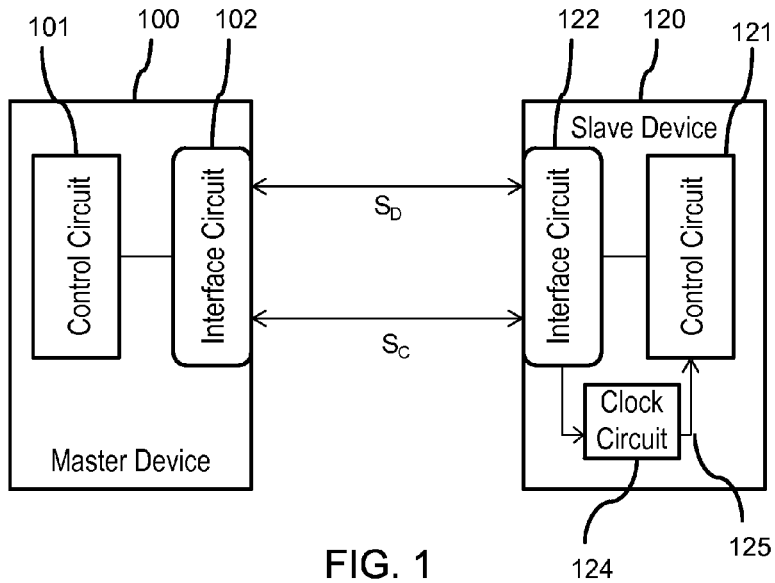
FIG. 1 shows a block diagram of an example of a system for serial communication.

FIG. 1 shows an example of a system for serial communication. A first electronic device 100, called a master device, is coupled via a serial interface to a second electronic device 120, called a slave device. The slave device has a serial interface unit 122 for communicating with the master device having a serial interface unit 102 according to a serial protocol via a serial data line $S_D$ and a serial clock line $S_C$.

The master device has a control unit 101 for controlling the serial interface unit 102 and performing further operations. The further operations may include any logical or other function, such as a programmable system controller, or a computer peripheral, etc. The master device may include any further digital or analog circuitry well known as such. The control unit may transmit or receive data and/or commands via the serial interface unit to or from other devices.

The slave device 120 has a control unit 121 for controlling the serial interface unit 122 and performing further operations. The further operations may include any logical or other function, such as controlling an analog element such as a motor or lighting unit, an RF transmitter or receiver circuit, or a computer peripheral, etc. The slave device may include any further digital or analog circuitry well known as such. The control unit may receive or transmit data and/or commands via the serial interface unit from or to other devices.

The serial protocol defines a clock cycle that has a clock pulse on the serial clock line and a serial data bit value on the serial data line to be communicated synchronously to said clock pulse. The serial protocol also defines a serial data word transfer having a predetermined number of clock cycles for communicating a data word. The data word has a number of data bit values. The data word may be preceded by a number of address bits.

Various serial communications systems are known as such, e.g. the Serial Parallel Interface (SPI) by Motorola as described in [1] mentioned above, or the well known I²C serial bus. In the further description the example of the SPI serial interface will be used, but the enhancements may be applied to any serial interface system.

The serial protocol further defines the serial data word transfer to comprise a further predetermined number of reserved clock cycles that are not assigned for communicating a data bit value of the data word. The reserved clock cycles have the function of enabling the slave device to perform synchronized logical operations, and do not transfer bits on the serial interface. Clock cycles for address bits and/or other control bits related to the data word are assigned to transfer such specific bits and hence are not to be considered when discussing the reserved clock cycles. The slave device comprises a clock unit arranged to be coupled to the serial clock line for generating a derived clock based on the clock pulses of the reserved clock cycles of the serial data word, and a control unit for performing a logical operation based on the derived clock. The effect is that the slave device is provided with the derived clock which is synchronous to the serial clock on the serial interface. Thereby the logical operation can be robustly controlled according to the derived clock. Also, the need for a circuit for generating a local clock in the slave device may be obviated, and the local clock be omitted.

Optionally the serial protocol further defines the serial data word transfer as a write access to the slave device, in which the predetermined number of clock cycles is followed by the reserved clock cycles. Thereby the logical operation can be controlled synchronously to the reserved clock cycles immediately following the data bit value transfer of the data word.

The device has a clock unit 124 for providing a local clock signal. The local clock signal is coupled to the control unit 121 to trigger logical operations of the control unit. For example the control unit has a finite state machine that progresses to a next state based on said local clock signal. The local clock signal may be generated based on selected clock pulses on the serial clock line of the serial interface. Thereto the clock unit is coupled to the serial clock line for providing a so-called derived clock based on the clock pulses of reserved clock cycles of a serial data word. Hence the control unit may perform a logical operation based on the derived clock.

The reserved clock cycles are provided as follows. The serial protocol defines the serial data word transfer to comprise a predetermined number of reserved clock cycles that are not assigned for communicating a data bit value of the data word. During such reserved clock cycles the value of the data line may be set to a predefined value, or the value may be undefined, or the data line may be at high impedance, or the data line may be used for any further operation. Hence the clock pulses on the serial clock line are defined, and delivered by the master device to the serial clock line during the reserved clock cycles. These clock pulses are used in the slave device to provide the derived clock by the clock circuit 24. No local clock generator is necessary for performing such operations in the slave device.

As the clock pulses from the serial line are used in the slave device, the mechanism in the slave device that is operated by such clock is automatically synchronous to the master clock on the serial interface. Optionally, in the slave device a further clock generator is provided for generating a further local clock in addition to the clock pulses from the serial clock line during said reserved clock cycles.

It is noted that the derived clock enables a number of processing steps to be performed synchronously to the timing of the clock on the serial clock line, which is set by the master device. Hence the master device is enabled to synchronously perform, activate or trigger functions in the slave device.

Figure 2:
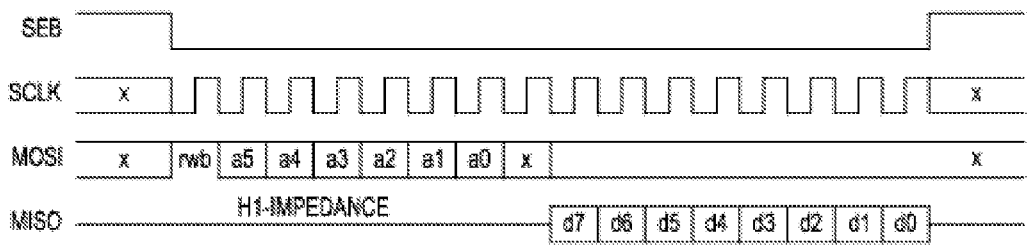
FIG. 2 shows a timing diagram of a read and write operation on a serial interface.
Figure 2:
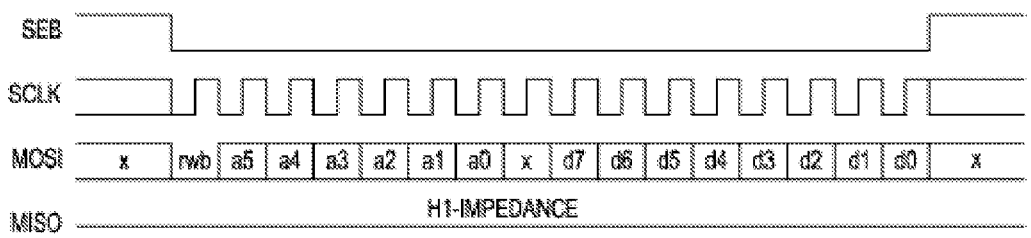

FIG. 2 shows a read and write operation on a serial interface. The upper part of the figure shows the signals during a read operation on the SPI serial interface. The first signal is SEB which is a select signal. The select pin is used to output the select signal from the SPI module to another peripheral with which a data transfer is to take place when its configured as a Master and its used as an input to receive the slave select signal when the SPI is configured as Slave. The serial clock line SCLK provides clock pulses for timing the data transfer, whereas the serial data line has two signals MOSI: Master Output, Slave Input and MISO: Master Input, Slave Output. On a device a MOSI pin is used to transmit data out of the SPI module when it is configured as a Master and receive data when it is configured as Slave. The MISO pin is used to transmit data out of the SPI module when it is configured as a Slave and receive data when it is configured as Master.

In the example of the SPI signals a[5:0] is the SPI address to be written, d[7:0] is the data that is written to, or read from this address. and "rwb" is the read write bit. Read of data from a slave device is done when rwb is '1', write to a slave device is done when rwb is '0'. Each bit is transferred during a clock cycle having one clock pulse, the data being valid on the respective serial data line on the rising edge of the clock pulse.

Figure 3:
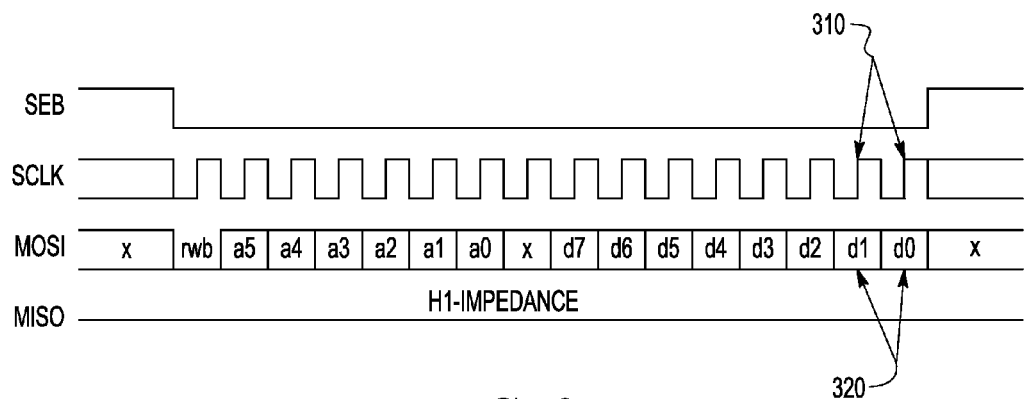
FIG. 3 shows a timing diagram of transfer of a data word having reserved clock cycles.

FIG. 3 shows transfer of a data word having reserved clock cycles. The figure shows the same serial interface signals as in the SPI example discussed with FIG. 2, but now the final two clock cycles 310 constitute reserved clock cycles. The data bits values 320, originally providing d1 and d0 of the data word, are now not used to transfer any data. The value of the serial data line MOSI may also be predetermined (high or low) or at high impedance. In the embodiment, the serial protocol defines the serial data word transfer as a write access to the device, as rwb is low. During the write access, the predetermined number of clock cycles (6 in the example) is followed by the reserved clock cycles (2 in the example). Hence the data word now only has 6 data bits that are transferred.

In the slave device, the control unit 121 may arranged for controlling an analog function based the derived clock by the data bit values of the transferred data word. The data bit values are received by the slave device during the write access. Subsequently, the control unit is activated to control some analog circuit or function that is connected to the control unit.

In an embodiment the serial protocol further defines the serial data word transfer as a read access from the slave device, in which the predetermined number of clock cycles is preceded by the reserved clock cycles (not shown). When the write access is done with 6 bit data and 2 clock cycles free, the read access may also be done on 6 bit data and 2 free clock cycles. Then the numbers of free clock cycles are identical for read and write on communication from slave to master. Optionally, the numbers of free cycles for write access and read access may be set differently. Furthermore, the number of free cycles can be 2 between the master and a first slave device, but may be 3, 4 or more with another slave device, e.g. dependent on the type of the slave device. In a further example, similar to FIG. 3, now the values d7, d6 and d5 may be replaced by three reserved clock cycles, whereby the data word is shortened to 5 data bits to be read from the slave device. The reserved clock cycles preceding the data bits enables the slave device to synchronously retrieve any values from a controlled circuit, device or sensor, and to prepare transfer of the retrieved value via the serial interface in the subsequent clock cycles.

In the slave device, the control unit may be arranged for retrieving a data result based from an analog function based the derived clock and for outputting the data result as the data bit values of the transferred data word. The control unit may have inputs and/or outputs coupled to an analog circuit. Parameters may be set or retrieved from the analog circuit, and analog functions of such circuit may be easily controlled or measured via the control unit 121.

Effectively the data format has been changed with respect to the existing serial protocol. The number of data written for each byte is reduced to a value lower than 8 (e.g. 6), while the number of cycles is still kept at 8 for a write access. The remaining clock cycles (e.g. 2) corresponding to the reserved data can be used to operate the digital controller. Similarly a lower number of data bits may be set for other standardized serial word lengths. For example, lengths of 16, 24, 32 may be further standard access lengths in the serial interface, and may be reduced to 14, 20, 24 respectively. A longer word may enable using a higher number of remaining clock cycles, e.g. 2, 4, 6 or 8, or any number up to n−1 for a word length of n.

Figure 4:
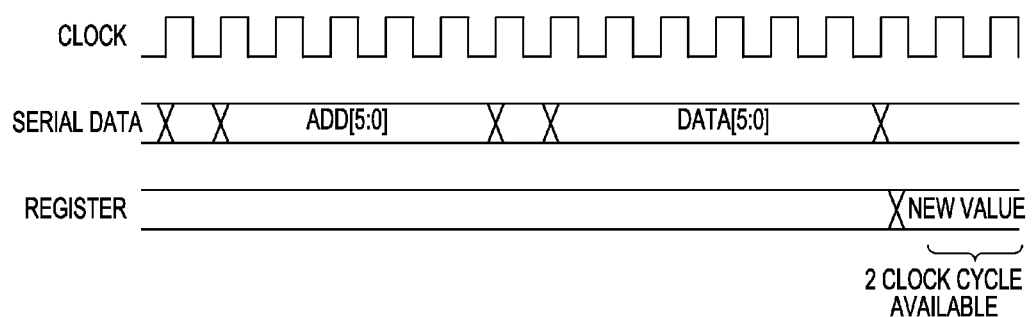
FIG. 4 shows a timing diagram of serial data transfer to a register.

FIG. 4 shows serial data transfer to a register. The serial clock provides clock pulses. The serial data signal first shows 6 address bits Add[5:0], which are used to select a specific register that will receive the data. After an intermediate bit six data bits Data[5:0] are transferred. After the six data bits 2 reserved clock cycles are made available for manipulating the new value that is present in the register. During the 2 reserved clock cycles no further data values are transferred on the serial data line.

Figure 5:
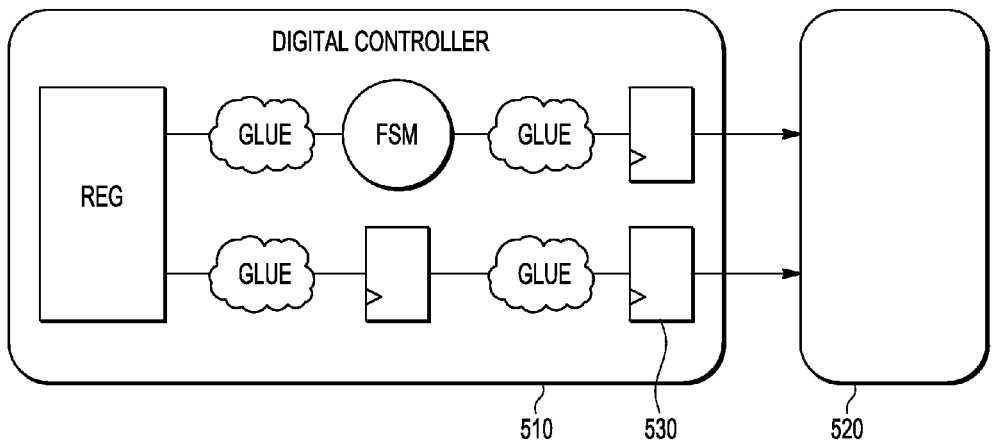
FIG. 5 shows a block diagram of a digital controller and associated state machine.

FIG. 5 shows a digital controller and associated state machine. In the figure a digital controller 510 is coupled to an analog device 520. In practice, the controller and the analog device may be included in a single semiconductor device or electronic circuit. The controller 510 has an associated finite state machine FSM which is coupled via glue logic circuitry to the serial register REG. The register may receive data via the serial interface as discussed with FIG. 4 above. The controller 510 may further include one or more flip-flops 530. The state machine FSM and the flip flops 530 are driven by the derived clock which is based on the reserved clock cycles as described above. Hence the operation of the state machine FSM and the flip flops is synchronous to the derived clock and the clock pulses on the serial clock line during the reserved clock cycles.

Figure 6:
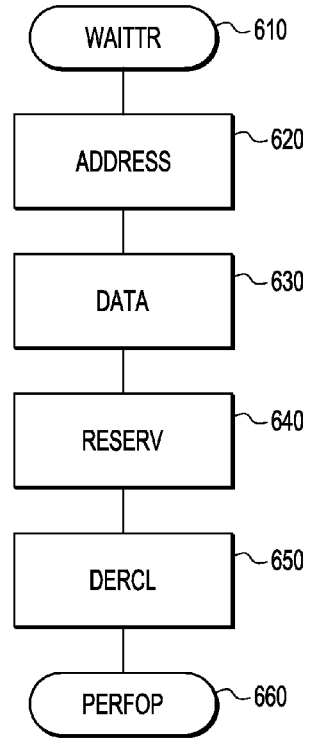
FIG. 6 shows a flow-chart of an example of a method of controlling a slave device.

The flow-chart of FIG. 6 illustrates a method of controlling a slave device. The method starts at WAITTR 610, when both the master device and the slave device are waiting for a data transfer. When data has to be transferred, in a first stage ADDRESS 620, the master device will initiate a data transfer and take control of the data and clock lines of the serial interface. The master may select a particular slave device and send corresponding selection, addressing and status data via the serial lines as defined in the respective serial protocol. In a next stage DATA 630, the master and slave device exchange a predetermined number of data bits via clock cycles according to the respective serial protocol. Subsequently, the method proceeds, in the serial data word transfer according to the serial protocol, in stage RESERV 640, by transferring a further predetermined number of reserved clock cycles that are not assigned for communicating a data bit value of the data word. In the slave device, in stage DERCL 650, the method proceeds by providing a derived clock based on the clock pulses of the reserved clock cycles of the serial data word. Finally, at stage PERFOP 660, the method concludes by performing a logical operation based on the derived clock.

In an embodiment, the serial protocol defines a data word without reserved clock cycles and additionally also an enhanced data word transfer having the reserved clock cycles. The number of reserved clock cycles may be fixed, or may vary for a respective slave device to which the data is to be communicated. Hence, the protocol may define a first serial data word transfer comprising a first predetermined number of clock cycles for communicating a data word having the first predetermined number of data bit values, and a second serial data word transfer having the first predetermined number of clock cycles for communicating a data word having less data bit values than the first predetermined number of data bit values. In such a data word transfer a number of clock cycles remain after the data bit values have been outputted. The remaining number of the first predetermined number of clock cycles constitute the reserved clock cycles. For example, the first predetermined number is eight and the remaining number constituting the reserved clock cycles is two. For other word lengths, the first predetermined number may be 16, 24, or 32 and the remaining number constituting the reserved clock cycles may then 2, 4, 6, or 8.

In summary, versatility and flexibility of analog integrated circuits can be accomplished by remote control (e.g. based on software). Such control may be achieved by a master control unit (MCU) via a serial interface, such as SPI. SPI is one of the interface standards commonly used between a MCU (master) and a set of analog circuits (slave) in a given electronic control system. Read/write accesses to the SPI slave node can be achieved by using the clock signal provided by the master node according to SPI protocol. Additionally, the state machine associated to the slave node SPI needs a local clock to exercise the control of the analog functions following a write access. A free-running clock (on chip or external) may be undesirable, due to cost, complexity, noise disturbance, etc. In particular for analog and RF circuits, where the digital control is only used for setting the analog block in the desired configuration, a disturbance may be caused by a traditional local clock circuit. Moreover, such a free-running clock is asynchronous to the serial clock, which provides further difficulties. The serial protocol now provides reserved clock cycles that are used in the slave device to provide a derived clock. Hence, the derived clock is used internally in the slave device to perform internal synchronous operations.

Asynchronous state machines and further asynchronous operations are not robust in digital design. The current system allows building a synchronous circuit, that can be designed and verified with digital tools, e.g. by Clock Tree insertion, timing check, etc. The above enhanced serial protocol and master and/or slave devices present a way to operate synchronously a digital controller in a slave device without a local clock generator through a serial interface.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details have not be explained in any greater extent than that considered necessary, as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An electronic device comprising:
a serial interface circuit to communicate with a master device according to a serial protocol via a serial data line and a serial clock line, wherein the serial protocol defines:
  a clock cycle comprising a clock pulse on the serial clock line and a serial data bit value on the serial data line to be communicated synchronously to said clock pulse; and
  a serial data word transfer comprising a predetermined number of clock cycles to communicate a data word having data bit values and a further predetermined number of reserved clock cycles that are not assigned to communicate a data bit value of the data word; and
the device comprises:
  a clock circuit, coupled to the serial clock line, and configured to provide a derived clock based on the clock pulses of the reserved clock cycles of the serial data word,; and
  a control circuit configured to perform a logical operation based on the derived clock.

2. The device as claimed in claim 1, wherein the serial protocol further defines the serial data word transfer as a write access to the device, in which the predetermined number of clock cycles is followed by the reserved clock cycles.

3. The device as claimed in claim 1, wherein the control circuit is arranged to control an analog function based the derived clock by the data bit values of the transferred data word.

4. The device as claimed in claim 1, wherein the serial protocol further defines the serial data word transfer as a read access from the device, in which the predetermined number of clock cycles is preceded by the reserved clock cycles.

5. The device as claimed in claim 4, wherein the control circuit is arranged to retrieve a data result from an analog function based on the derived clock and to output the data result as the data bit values of the transferred data word.

6. The device as claimed in claim 1, wherein the serial protocol defines:
  a first serial data word transfer comprising a first predetermined number of clock cycles to communicate a data word having the number of data bit values; and
  a second serial data word transfer comprising the predetermined number of clock cycles to communicate a data word having less data bit values than the number of data bit values, the remaining number of said predetermined number of clock cycles constituting the reserved clock cycles.

7. The device as claimed in claim 6, wherein the predetermined number of clock cycles is eight and the remaining number constituting the reserved clock cycles is two.

8. The device as claimed in claim 6, wherein the first predetermined number of clock cycles is 16, 24, or 32 and the remaining number constituting the reserved clock cycles is 2, 4, 6, or 8.

9. A master device comprising:
a serial interface circuit to communicate with a serial slave device according to a serial protocol via a serial data line and a serial clock line, wherein the serial protocol defines:
  a clock cycle comprising a clock pulse on the serial clock line and a serial data bit value on the serial data line to be communicated synchronously to said clock pulse; and
  a serial data word transfer comprising a predetermined number of clock cycles for communicating a data word having data bit values;
the serial interface circuit is configured to accommodate the serial data word transfer to comprise a further predetermined number of reserved clock cycles that are not assigned to communicate a data bit value of the data word; and
the slave device comprises:
  a clock circuit arranged to be coupled to the serial clock line to provide a derived clock based on the clock pulses of the reserved clock cycles of the serial data word; and
  a control circuit to perform a logical operation based on the derived clock.

10. The master device as claimed in claim 9, wherein the serial protocol further defines the serial data word transfer as a write access to the device, in which the predetermined number of clock cycles is followed by the reserved clock cycles.

11. The master device as claimed in claim 9, wherein the serial protocol further defines the serial data word transfer as a read access from the device, in which the predetermined number of clock cycles is preceded by the reserved clock cycles.

12. The master device as claimed in claim 11, wherein the control circuit is arranged for inputting a data result from an analog function in the slave device based the derived clock.

13. The master device as claimed in claim 9, wherein the serial protocol defines:
  a first serial data word transfer comprising a first predetermined number of clock cycles for communicating a data word having a first predetermined number of data bit values; and
  a second serial data word transfer comprising the first predetermined number of clock cycles for communicating a data word having less data bit values than the first predetermined number of data bit values, the remaining number of said first predetermined number of clock cycles constituting the reserved clock cycles.

14. The master device as claimed in claim 13, wherein the first predetermined number is eight and the remaining number constituting the reserved clock cycles is two.

15. The master device as claimed in claim 13, wherein the first predetermined number is 16, 24, or 32 and the remaining number constituting the reserved clock cycles is 2, 4, 6, or 8.

16. A method of communicating between a slave device and a master device according to a serial protocol via a serial data line and a serial clock line, the serial protocol defining a clock cycle comprising a clock pulse on the serial clock line and a serial data bit value on the serial data line to be communicated synchronously to said clock pulse, and a serial data word transfer comprising a predetermined number of clock cycles for communicating a data word having data bit values, the method comprising:
  transferring, in the serial data word transfer according to the serial protocol, a further predetermined number of reserved clock cycles that are not assigned for communicating a data bit value of the data word; and
  providing a derived clock based on the clock pulses of the reserved clock cycles of the serial data word, and performing a logical operation based on the derived clock.

17. The method as claimed in claim 16, wherein the serial protocol further defines the serial data word transfer as a write access to the device, in which the predetermined number of clock cycles is followed by the reserved clock cycles.

18. The method as claimed in claim 16, wherein the serial protocol defines:
   a first serial data word transfer comprising a first predetermined number of clock cycles for communicating a data word having a first predetermined number of data bit values; and
   a second serial data word transfer comprising the first predetermined number of clock cycles for communicating a data word having less data bit values than the first predetermined number of data bit values, the remaining number of said first predetermined number of clock cycles constituting the reserved clock cycles.

19. The method as claimed in claim 18, wherein the first predetermined number is eight and the remaining number constituting the reserved clock cycles is two.

20. The method as claimed in claim 18, wherein the first predetermined number is 16, 24, or 32 and the remaining number constituting the reserved clock cycles is 2, 4, 6, or 8.

\* \* \* \* \*